United States Patent [19]

Cook et al.

[11] 4,391,705
[45] Jul. 5, 1983

[54] BALLASTING DIGESTOR COVERS

[75] Inventors: Lynn W. Cook, Fruit Heights; David P. Brown, Salt Lake City, both of Utah

[73] Assignee: Envirotech Corporation, Salt Lake City, Utah

[21] Appl. No.: 268,214

[22] Filed: May 29, 1981

[51] Int. Cl.³ .............................................. C02F 11/04
[52] U.S. Cl. ............................ 210/218; 210/DIG. 9; 220/216; 220/227; 422/184; 435/167; 435/287; 435/801
[58] Field of Search ................. 210/218, 603, DIG. 9, 210/180, 121; 48/197 A; 435/801, 313, 316, 167, 287; 220/216, 225, 227; 422/184

[56] References Cited

U.S. PATENT DOCUMENTS

| | | | |
|---|---|---|---|
| 3,187,897 | 6/1965 | Walker | 210/218 |
| 3,288,295 | 11/1966 | Kelly | 210/121 |
| 3,298,670 | 1/1967 | Crom | 210/DIG. 9 |
| 3,535,236 | 10/1970 | Travis | 210/218 |
| 4,166,791 | 9/1979 | Marvin | 210/180 |
| 4,230,580 | 10/1980 | Dodson | 210/DIG. 9 |
| 4,274,838 | 6/1981 | Dale et al. | 210/612 |

*Primary Examiner*—Benoît Castel
*Attorney, Agent, or Firm*—R. E. Krebs

[57] ABSTRACT

A digestor includes a tank and an inverted dish-shaped cover, the lower end of which extends into sludge contained within the tank. The cover is ballasted by a number of ballast members which resemble tubs and which are integrally formed of concrete. Each ballast member is mounted with its cavity facing upwardly so that the ballast cavities automatically fill with sludge upon startup of the digestor. When partially surfaced above the sludge, the predetermined total weight of sludge in the ballast members causes a substantial increase in the pressure exerted by the cover on the contained gas than would be exerted by the cover and unfilled ballast members.

3 Claims, 3 Drawing Figures

BALLASTING DIGESTOR COVERS

BACKGROUND OF THE INVENTION

This invention relates generally to equipment for use in handling and storing gas such as gas produced by decomposing organic liquid-solid mixtures, and more particularly to gas storing or digesting apparatus that includes a tank for storing a large volume of liquid and a cover having a sidewall that extends into the liquid to form a liquid seal near the bottom edge of the sidewall to thereby trap a volume of gas between this liquid in the tank and the top of the cover.

U.S. Pat. No. 3,288,295 to E. M. Kelly discloses an anaerobic digestor of the type including a tank and a dome-shaped cover that includes a buoyant chamber or trough formed as an integral part of the cover itself. As illustrated therein, the tank is formed from concrete and has an upright cylindrical sidewall provided with corbels for supporting the cover during periods of clean-out. Gas-evolving material (hereinafter called sludge) to be anaerobically digested is admitted into the tank through a sludge feed pipe, while supernatant or treated material is withdrawn through another conduit located at the desired surface level of the liquid. The size and configuration of the buoyant chamber is accurately predetermined having regard to the weight of entire cover assembly and the specific gravity of the sludge to be treated.

While prior known digesting apparatus has been generally satisfactory, it has been difficult to design relatively low-cost cover assemblies to achieve the desired operating pressures for the gas contained under the cover. In some instances, for example, it is desired to generate a pressure 3 in. W.C. (water column) or greater within the trapped gas. Such higher pressures are desired when the methane gas generated by anaerobic digestion of municipal waste sludge is to be used by more than one piece of equipment, for example, for use in heating the sludge to be treated and also in powering an engine for driving auxilliary equipment. The use of known prior art ballasting techniques to accomplish this end has lead to unduly heavy and complex cover assemblies.

SUMMARY OF THE INVENTION

In accordance with our invention, a digestor cover of the type adapted to extend into the sludge or liquid includes recessed ballast members that are upwardly concave to automatically receive and thereafter contain predetermined volumes of the sludge within the ballast recesses. As more gas is generated by the digestion process and the cover is forced upwardly by increasing gas pressure, the added weight of the sludge contained in the respective ballast members is such that a substantial pressure increase is generated by the filled ballast members. In this manner, the recessed ballast members provide a substantial ballasting effect when partially emerged from the liquid to thus provide increased gas pressure, and this result is accomplished without substantially increasing the dry weight or the complexity of the cover assembly.

DESCRIPTION OF THE PREFERRED EMBODIMENT

Figure 1:
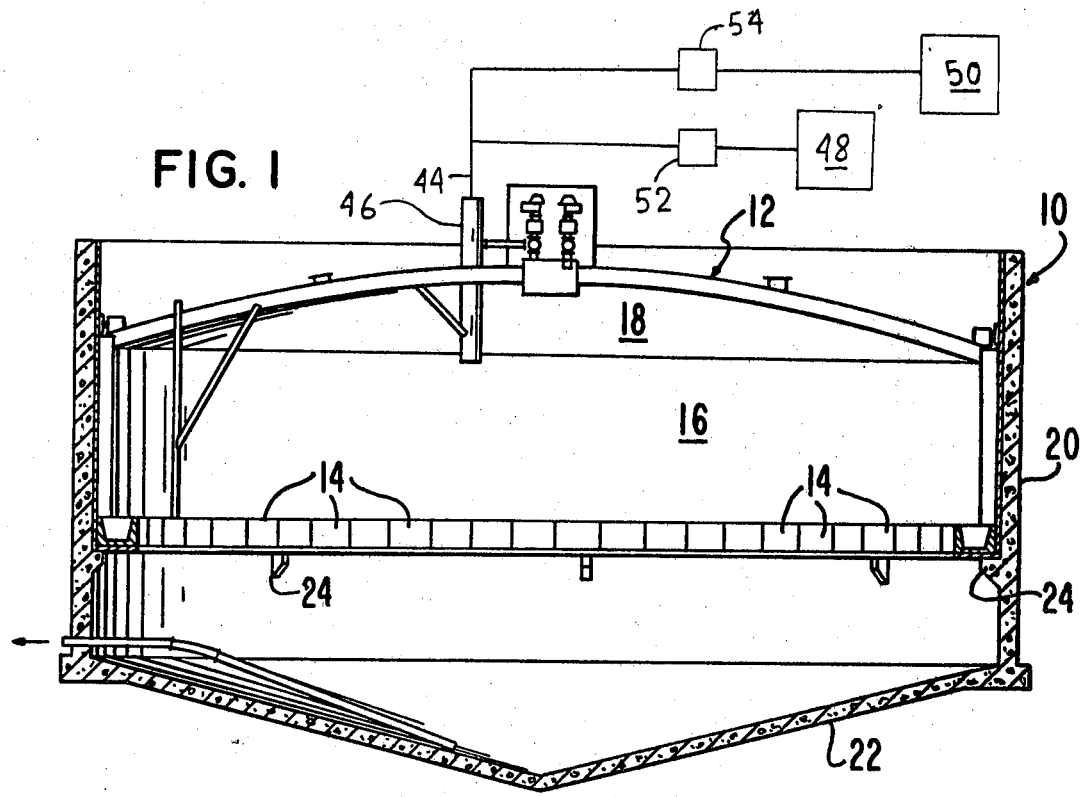
FIG. 1 is a somewhat diagrammatic sectional view taken in a vertical plane extending through a digestor constructed according to the present invention.
Figure 2:
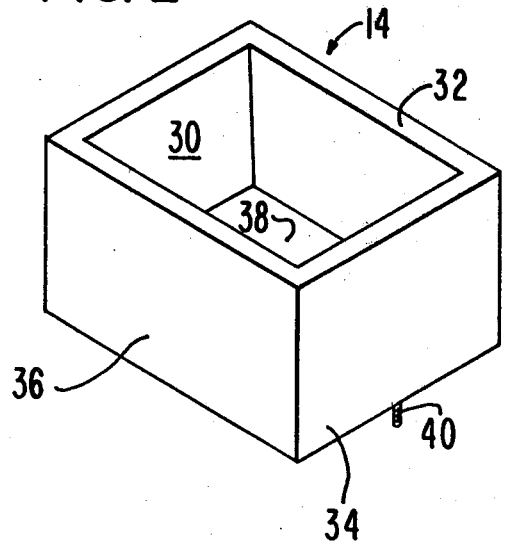
FIG. 2 is an enlarged perspective view of one of the recessed ballast members of the digestor.

A preferred embodiment of the present invention shall now be particularly described in connection with FIGS. 1–3. An anaerobic digestor for treating municipal waste sludge includes a concrete tank 10 and a cover 12 mounted for vertical movement upwardly and downwardly within the tank like a piston within a cylinder. The cover is used to contain and store a methane gas mixture produced by digestion of municipal waste sludge within the tank. The tank includes an upright cylindrical sidewall 20 and a conical bottom wall 22. The digestor further includes a cover 12 that is of an inverted bowl or cup shape and that has a cylindrical sidewall 16 and a dome-shaped top wall 18. The cover is shown in FIG. 1 in a pre-start-up mode resting on corbels 24, there being no sludge within the digestor. Other details of construction of the digestor are known from the aforementioned Kelly U.S. Pat. No. 3,288,295, the disclosure of which is incorporated herein by reference.

The present invention contemplates a major advance in the mechanism for ballasting the cover 12 through the application of a new concept. Stated broadly, the ballasting structure is adapted to automatically fill with a predetermined quantity of the sludge itself during start-up and to thereafter retain the quantity of sludge, thereby minimizing the dry weight of the cover assembly but substantially enhancing its ballasting weight after start-up. Toward this end, a plurality of recessed ballast members 14 are mounted to the lower end and adjacent the interior surface of the sidewall 16 of the cover. The members are generally block-shaped, having rectangular outlines in its plan and end views. Each member is identical and includes a bottom wall 38 and four upright walls 30-36 extending vertically from the periphery of the bottom wall to define an upwardly opening cavity. Ballast members 14 are integrally formed from concrete. Since they can be seen in FIG. 3 to resemble tubs, such ballast members shall hereinafter be referred to as ballast tubs. The tubs are adapted to be automatically filled with sludge SL (FIG. 3) upon start-up so that when they are subsequently lifted with the sidewall 16 to partially emerge from the surface level SL of the sludge in tank 10, the effective weight of each tub will be equal to the unladen or dry weight of the tub itself, plus the predetermined weight of the sludge contained therein (indicated by LQC in FIG. 3). Thus, the cover 12 will be considerably lighter in its pre-start-up, unladen condition shown in FIG. 1, than during its normal digestion condition as indicated in FIG. 3.

Figure 3:
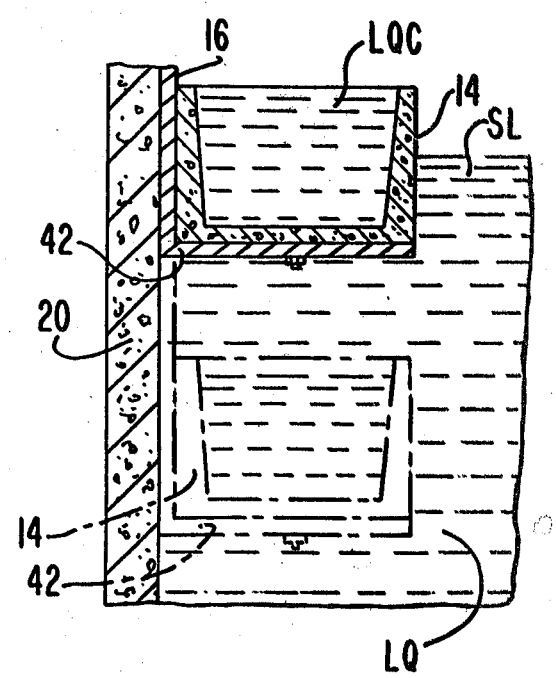
FIG. 3 is a fragmentary sectional view that diagrammatically shows, in solid outline, an elevated position of a filled ballast member wherein the member has partially surfaced from the surface level of the sludge and in phantom outline, a fully submerged position of a ballast member.

FIG. 3 shows that the concrete ballast tubs have threaded rods 40 embedded therein and extending downwardly from the bottoms thereof. The tubs are diagrammatically shown in FIGS. 1 and 3 as being mounted on shelf 42 extending inwardly from the bottom edge of the sidewall 16 of the cover 12. FIG. 1 shows that the ballast tubs are mounted end-to-end upon the shelf, while FIG. 3 depicts the ballast member as being bolted to the shelf. If it is desired to provide additional support for the ballast tubs, the inner ends of the shelf (or equivalent support bracket structures) may be suspended upon tie rods that depend from the top wall structure 18 of the cover.

As previously indicated, the purpose of the upwardly facing cavities in the ballast tubs 14 is to automatically entrap (as in a ladle) a predetermined quantity of sludge (indicated by LQC in FIG. 3) as it rises above the normal liquid level in the tank 10, the total quantity of sludge corresponding to the total of the volumes of the cavities in the plurality of tubs. The tubs are mounted in the same horizontal plane and are thus conjointly elevated above the surface level. Therefore, the weight of the cover in its entirety will increase in a linear relationship to the extent to which the ballast tubs project upwardly through the surface level. To produce a desired operating or system pressure, the amount of increase in ballast weight due to the entrapped sludge can be tailored, that is, predetermined, in accordance with the specific gravity of the sludge SL, the volume, configuration, and specific gravity of the ballast tubs and the entire unladen weight of the cover without the ballast tubs attached.

The elevation of the cover 12 within the digestor tank 10 is proportional to the gas pressure, and thus pressure regulator valves are provided for controlling the usage of the gas. As shown in FIG. 1, an outlet conduit 44 is connected to a gas bonnet 46 located near the center of the cover. The conduit provides egress for gas (e.g. a methane gas mixture) evolved in the digestor and directs it to either a first gas-consumption device or devices 48 (such as a heater used in conjunction with a heat exchanger to heat sludge for feeding to the digestor) or to both the first device 48 and a second gas-consumption device 50 (such as a waste gas burner). Pressure regulator valves 52 and 54 are provided for regulating flow from conduit 44 to the devices 48 and 50, respectively. Regulator 52 is set at an opening pressure dependent upon the gas consumption needs of the device 48, for example, at a relatively high level such as 4 in. W.C. (the enhanced pressure being made possible by the recessed ballast tubs 14). Regulator 54 is set to also open and direct gas to the other device when a higher system pressure is developed. In the event the latter regulator valve malfunctions, a safety relief valve is mounted to the cover at its center to vent the gas into the atmosphere when the cover is fully elevated against its stops (as discussed in the afore-mentioned Kelly U.S. Pat. No. 3,288,295). It is contemplated that the valve 52 associated with the primary gas-consumption device or devices 48 will be set so that the ballast tubs will remain somewhat elevated and that the valve 54 will open after the tubs have been further elevated from the sludge but well before the cover is so elevated to break the liquid seal at the bottom of the cover.

From the foregoing, it will be understood that a digestor, (or other gas and liquid containing apparatus having a tank and similar movable cover) can be effectively highly ballasted without proportionately increasing the unladen or pre-start-up cover and ballast weight. Although shown with simple tub-shaped, concrete ballast members 14, it will become evident that other materials and configurations are possible, it only being important that at least some of the ballast members each include a cavity or recess that opens upwardly and that is fillable with the liquid to be treated or stored, so that when the tank 10 is filled with liquid, the cavities are filled.

We claim:

1. An apparatus for digesting sludge comprising: a cylindrical tank, a cover adapted to move upwardly and downwardly within the tank, with the cover having an upright cylindrical sidewall the lower end thereof adapted to project into the sludge to form a gas-tight seal therewith and with gas being stored under the cover above the surface level of the sludge, a gas outlet at the upper end of the cover, valve means communicating with said outlet for regulating flow of gas from under the cover, a plurality of separate ballast members mounted to the interior of said sidewall near the lower end thereof, at least some of the ballast members each having a cavity formed in the upper end thereof that extends downwardly into the ballast member so that the cavity will fill with sludge upon flow of sludge into the tank and that is adapted to hold a predetermined substantial quantity of sludge therein, whereby when the volume of gas accumulated under the cover is sufficient to lift said ballast members partially from the sludge the predetermined total quantity of sludge within the ballast members effectively increases the total ballasting weight of the ballast members by a substantial predetermined amount over the ballasting weight of the members when they are not filled with sludge.

2. The digesting apparatus according to claim 1, wherein said ballast members are integrally formed from concrete and each ballast member in which a cavity is formed comprises a bottom wall and upstanding sidewalls that together define an upwardly facing cavity.

3. The apparatus according to either claim 1 or claim 2, wherein all of said ballast members are mounted to the cover sidewall in the same horizontal plane.

* * * * *

REEXAMINATION CERTIFICATE (1184th)
United States Patent [19]
Cook et al.

[11] B1 4,391,705
[45] Certificate Issued   Jan. 9, 1990

[54] BALLASTING DIGESTOR COVERS

[75] Inventors: Lynn W. Cook, Fruit Heights; David P. Brown, Salt Lake City, both of Utah

[73] Assignee: Envirotech Corporation

Reexamination Request:
No. 90/001,650, Nov. 26, 1988

Reexamination Certificate for:
Patent No.: 4,391,705
Issued: Jul. 5, 1983
Appl. No.: 268,214
Filed: May 29, 1981

[51] Int. Cl.$^4$ .............................................. C02F 11/04
[52] U.S. Cl. .............................. 210/218; 210/DIG. 9; 220/216; 220/227; 422/184; 435/167; 435/287; 435/801

[56] References Cited

U.S. PATENT DOCUMENTS

| | | | |
|---|---|---|---|
| 460,898 | 10/1889 | Thompson | 48/176 |
| 607,888 | 7/1898 | Smith | 48/144 |
| 1,735,461 | 11/1929 | Haupt | 220/224 |
| 1,794,383 | 3/1931 | Laird | 220/88 S |
| 1,930,953 | 10/1933 | Hampton | 220/224 |
| 2,061,175 | 11/1936 | Staber | 220/35 |
| 2,441,660 | 5/1948 | Crom | 48/177 |
| 2,516,101 | 7/1950 | Boberg | 220/225 |
| 2,968,420 | 1/1961 | Harris et al. | 220/225 |
| 3,187,897 | 6/1965 | Walker | 210/197 |
| 3,288,295 | 11/1966 | Kelly | 210/194 |
| 3,298,670 | 1/1967 | Crom | 210/319 |
| 3,535,236 | 10/1970 | Travis | 210/136 |
| 4,166,791 | 9/1979 | Marvin | 210/120 |
| 4,173,291 | 11/1979 | Hill | 221/1 |
| 4,230,580 | 10/1980 | Dodson | 210/170 |
| 4,274,838 | 6/1981 | Dale et al. | 210/218 |

FOREIGN PATENT DOCUMENTS 1077 of 1878 United Kingdom.
527604 10/1940 United Kingdom.

OTHER PUBLICATIONS

Ralph B. Carter Company Catalog D-632 Copyright 1963 entitled Floating Cover Digesters, all text and FIGs under Gasholders.
Eimco-Envirotech Drawing No. 22343D1 dated 01-2-8-76 "Gasholder Digester Cover", publicly available.
Envirotech Drawing No. 113305 dated 06-04-76 shows a gas holder cover with separate ballast blocks.
Salt Lake City Corporation, Sanitary Sewage Facilities drawing Gas System Spiral Rise Gas Holder Cover, Sheet 228 dated 03/63.
Babbitt & Bauman, Sewerage & Sewage Treatment, 8th ed., 1958, Fig. 25-2.

*Primary Examiner*—Peter Hruskoci

[57]   ABSTRACT

A digestor includes a tank and an inverted dish-shaped cover, the lower end of which extends into sludge contained within the tank. The cover is ballasted by a number of ballast members which resemble tubs and which are integrally formed of concrete. Each ballast member is mounted with its cavity facing upwardly so that the ballast cavities automatically fill with sludge upon start-up of the digestor. When partially surfaced above the sludge, the predetermined total weight of sludge in the ballast members causes a substantial increase in the pressure exerted by the cover on the contained gas than would be exerted by the cover and unfilled ballast members.

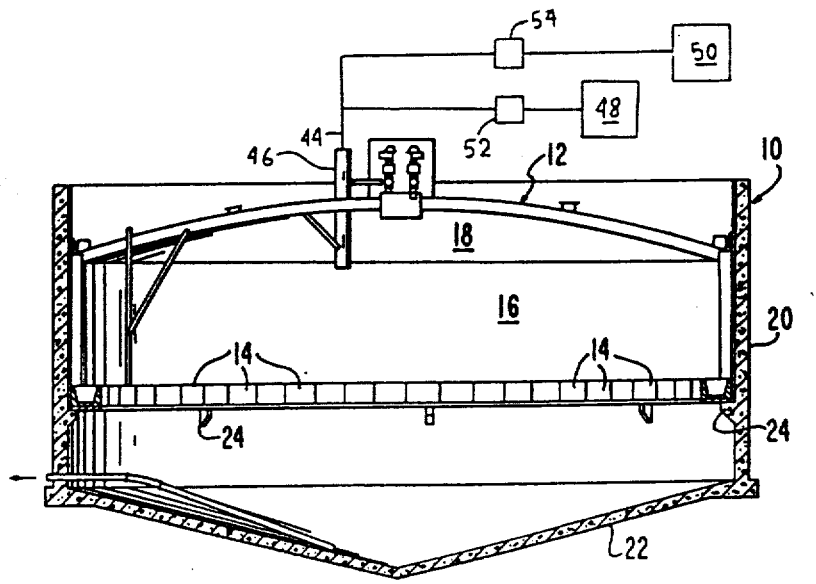

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–3 is confirmed.

* * * * *